(12) United States Patent
Rohner et al.

(10) Patent No.: US 6,316,848 B1
(45) Date of Patent: Nov. 13, 2001

(54) LINEAR MOTOR

(75) Inventors: Ronald Rohner, Berikon; Marco Hitz, Düdingen; Luca Ritter, Minusio, all of (CH)

(73) Assignee: NTI AG, Zurich (CH)

( * ) Notice: Subject to any disclaimer, the term of this patent is extended or adjusted under 35 U.S.C. 154(b) by 0 days.

(21) Appl. No.: 09/453,372

(22) Filed: Dec. 2, 1999

(30) Foreign Application Priority Data

Dec. 21, 1998 (EP) ................................................. 98811246

(51) Int. Cl.7 ................................................. H02K 41/00
(52) U.S. Cl. ................................................. 310/12
(58) Field of Search .................... 310/12, 13, 14, 310/68 R, 68 B, 68 C; 702/31, 32; 318/434, 490

(56) References Cited

U.S. PATENT DOCUMENTS 5,726,911 * 3/1998 Canada .................................. 364/550

FOREIGN PATENT DOCUMENTS

| 3410675C1 | * 10/1985 | (DE) . |
| 0088591A2 | * 9/1983 | (EP) . |
| 0332607A2 | * 9/1989 | (EP) . |
| 0874297A1 | * 10/1998 | (EP) . |
| WO 94/27516 | * 12/1994 | (WO) . |

OTHER PUBLICATIONS

Patent Abstracts of Japan vol. 95, No. 6, Jul. 31, 1995 & JP 07–75364A (Matsushita Electric Ind Co), Mar. 17, 1995 Abstract.*

* cited by examiner

Primary Examiner—Nestor Ramirez
Assistant Examiner—Judson H. Jones
(74) Attorney, Agent, or Firm—Townsend and Townsend and Crew LLP

(57) ABSTRACT

A linear motor having a stator and a runner which can be displaced in the direction of the longitudinal axis of the stator comprises at least one memory unit in which characteristic data for the respective linear motor are stored.

10 Claims, 9 Drawing Sheets

Fig. 7
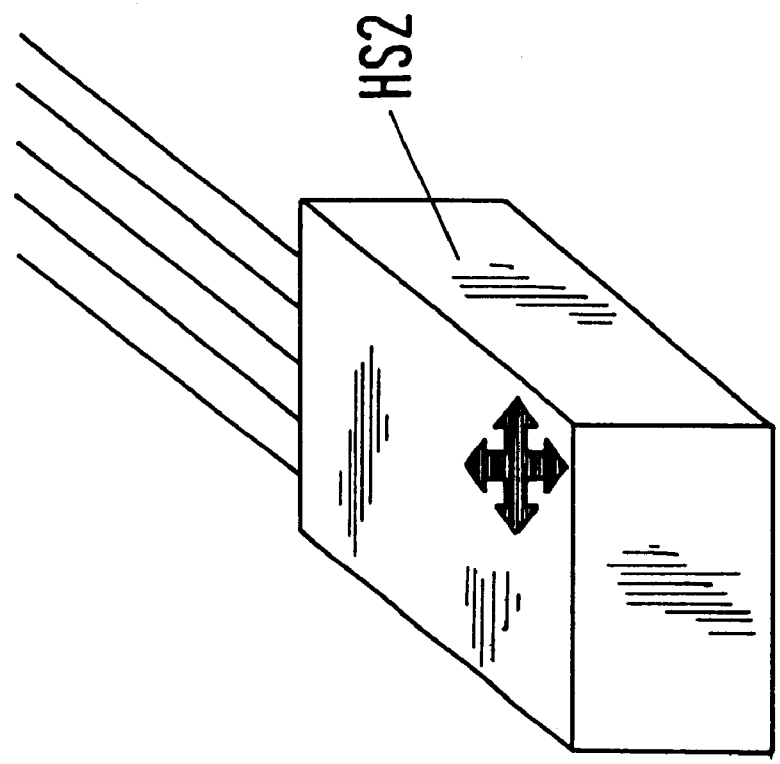
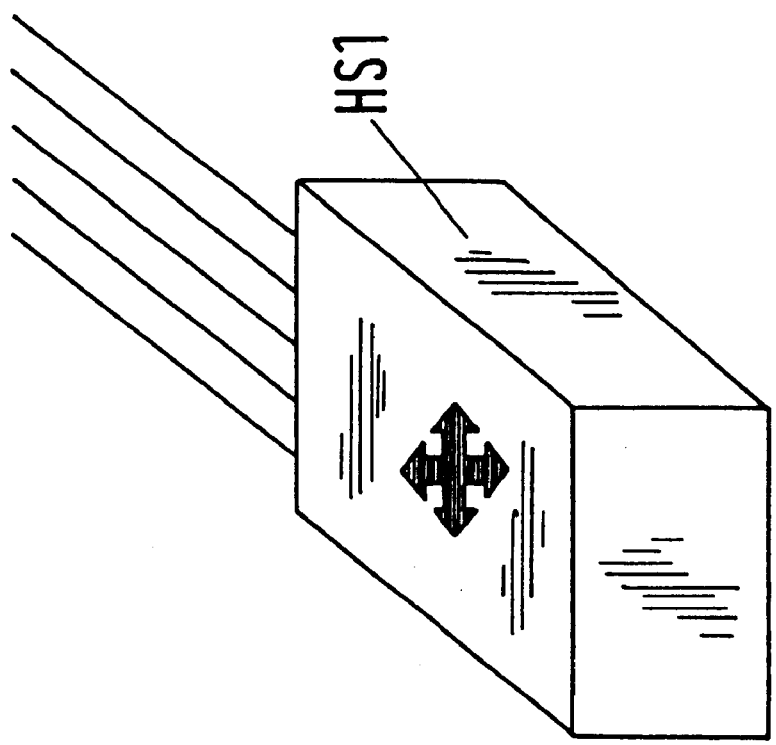

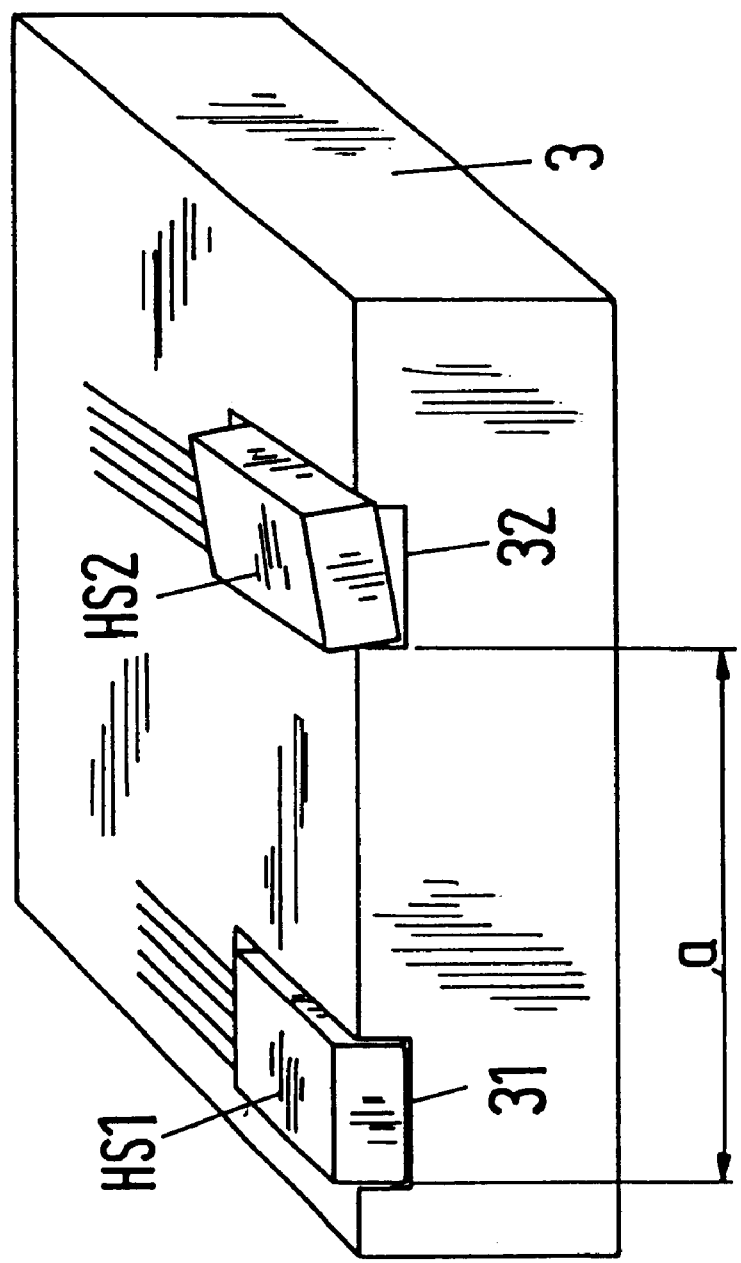

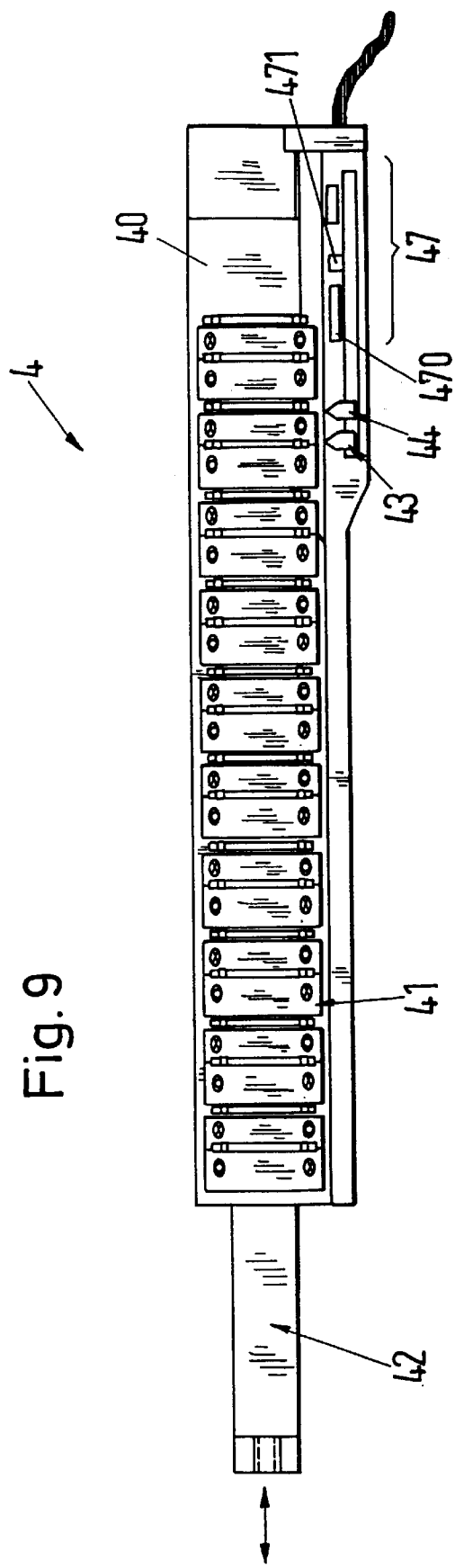

LINEAR MOTOR

BACKGROUND OF THE INVENTION

1. Field of the Invention

The invention relates to a linear motor.

2. Description of the Prior Art

Linear motors comprise a stator and a runner which is displaceable in the direction of the longitudinal axis of the stator. In this the runner can in principle be designed as an inner runner or as an outer runner. A known system of linear motors comprises one or more electronics units and linear motors which are connected to the latter. The electronics units represent, on the one hand, a connection to a higher level control system and are, on the other hand, responsible for the control or the regulation respectively of the linear motors which are connected to them.

In order to be able to take over the control or the regulation respectively of the linear motor the electronics unit must continually receive information on the current position of the runner. For this purpose for example two Hall sensors are mutually displacedly arranged in the stator in a typical exemplary embodiment of a linear motor and indeed in such a manner that they convert the magnetic field produced by the magnets of the runner into an electric sine or cosine output signal respectively as a result of their displaced arrangement. Furthermore, in this exemplary embodiment an amplifier circuit is also provided in the stator which amplifies the electric output signals of the Hall sensors so that it is also possible to transmit the comparatively weak output signals of the Hall sensors over a longer connection cable to the electronics unit. Otherwise only passive components are arranged in this exemplary embodiment, such as for example temperature sensors and naturally the coils of the linear motor.

It is immediately evident that the linear motors and the electronics units must be exchangeable among one another as desired; thus a linear motor of the same type must be able to function without problem with every electronics unit which is provided for its operation. This must already be the case since in the event of a defect in a linear motor or in an electronics unit the respective other non-defective component can be used unchanged.

This means that the linear motors and their individual components must be manufactured with manufacturing tolerances which are as low as possible—that is, with a high precision of reproduction. Then namely the control and regulation parameters can remain unchanged in the electronics unit and need not be determined anew. In practice however manufacturing tolerances are always to a certain extent present in the manufacture and cannot be completely avoided. This will be explained in the following.

The ideal state is first illustrated in FIG. 1. One recognizes there the output signals 1 and 2—the output voltages U—of two Hall sensors which are thus displacedly arranged with respect to one another and the sine- or cosine-shaped output signal respectively which is produced by the magnets of the runner, plotted as a function of the time t.

Hall sensors can have a certain offset voltage $U_{offset}$, which is superimposed at the output of the Hall sensor as a d. c. voltage component on the sine or cosine signal respectively which is produced by the magnets of the runner. This can be recognized in FIG. 2, where the signal 2 is displaced by the offset voltage $U_{offset}$ in the direction of the ordinate with respect to signal 1 (ideal signal without offset voltage).

Furthermore, Hall sensors can also have a phase shift offset $\phi_{offset}$, as is indicated in FIG. 3. There the signal 2 is displaced in the direction of the abscissa relative to the signal 1 by the phase shift offset $\phi_{offset}$.

Furthermore, Hall sensors can also have a different amplification factor. Thus with the same excitation of the runner by the magnets, one Hall sensor has an output signal—an output voltage U—which is less in amplitude than the amplitude of the output signal of the other Hall sensor. In FIG. 4 one recognizes such an example of two Hall sensors with different amplification factor: The amplitude of the signal 1 of the one Hall sensor is greater than the amplitude of the signal 2 of the other Hall sensor.

A further imprecision can result from the magnets of the runner. One recognizes in FIG. 5 that the distances d1 and d2, which in each case designate the spatial distance of two like magnetic poles (here: of two north poles), can vary slightly; the magnets have—when viewed in the direction of the movement of the runner—different lengths. In the example shown in FIG. 5 the maximum amplitude of the output signal of the Hall sensors is already achieved after a time t which corresponds to a phase angle of 350° when the speed is uniform; the distance d2 is thus less than the distance d1. If the like magnetic poles (here the north poles) were always equally spaced, the maximum amplitude would not arise again until a time t which corresponds to a phase angle of 360°.

Imprecisions can however also result from the mechanical arrangement of the Hall sensors. The Hall sensors HS 1 and HS2 are (see FIG. 6) arranged in a holder 3 in depression 31 and 32 ideally at a distance a from one another which corresponds to a phase angle of 90° when the distance of the magnets of the runner remains the same. As a result of this a sinusoidal output signal is produced by the one Hall sensor HS1 when passing the magnets of the runner, whereas a cosinusoidal output signal is produced by the Hall sensor HS2. This corresponds to the ideal case (see also FIG. 1). If the distance a does not exactly correspond to a phase angle of 90° then a phase shift offset, which was already explained with reference to FIG. 3, can arise.

A further cause for a phase shift offset can however also come from the fact that the actual Hall sensors HS1 and HS2 are not precisely centrally arranged inside the sensor housing. Such a case is drawn in FIG. 7, with the arrow crosses in each case indicating the direction and the amount of the displacement. The right sensor HS2 is thus arranged inside the depression 32 (not illustrated in FIG. 7, see FIG. 6) with a displacement to the right and to the front.

As already mentioned the Hall sensors HS1 and HS2 can have different amplification factors. Whereas the cause of this can be component-immanent—that is, the Hall sensors HS1 and HS2 have a different amplification factor in themselves at an ideal arrangement within the depressions 31 and 32—the different amplification factor can also result from an inclined installation position—in FIG. 8 e.g. of the Hall sensor HS2 within the depression 32.

On the whole it can thus be concluded that quality differences—if often only of slight extent—are always present and therefore reductions must be made or, respectively, compromises must be made in the design of the regulation and the reliable performance features of the linear motors.

It is furthermore disadvantageous in known linear motors that the latter are regularly labelled with stickers from which it can be determined of which type the linear motor is or, respectively, which variant within a type the linear motor is. If the writing on the label becomes illegible, then certain parameters of the linear motor can often be determined either only with difficulty or not at all. The serial number is in principle lost in such a case since a separate serial number is issued for each motor. This is disadvantageous precisely in the case of a necessary recall of linear motors since under certain conditions the affected linear motors can no longer be identified.

It is admittedly conceivable in principle to stamp the serial number into the housing (like the chassis number in automobiles), but this is however not practicable from the commercial side (cost and complexity).

As far as the respective variant of the linear motor within a type of linear motor is concerned, the different variants often have an absolutely identical appearance from the outside, but have a fundamentally different electrical "inner life". If the user then selects the false variant in the electronics unit, this can lead to faulty functioning. Previous attempts to solve this problem go in the direction of attempting to uniquely identify the motor type and the motor variant as a result of the signals which are measurable by the electronics unit. This is however not always possible for technical reasons.

SUMMARY OF THE INVENTION

The object of the invention is to propose a linear motor which does not have the numerous above-named disadvantages. In this the technical production cost and complexity in overcoming these disadvantages should be as low as possible.

BRIEF DESCRIPTION OF THE DRAWINGS

FIG. 7 illustrates an exemplary embodiment in which one of the Hall sensors is displacedly arranged in the sensor housing, FIG. 8 illustrates a holder, in the one depression of which one of the Hall sensors is arranged in an inclined installation position, and FIG. 9 illustrates an exemplary embodiment of a linear motor in accordance with the invention with a memory unit in which data which are characteristic for the respective linear motor are stored.

DETAILED DESCRIPTION OF SPECIFIC EXEMPLARY EMBODIMENTS

Figure 1:
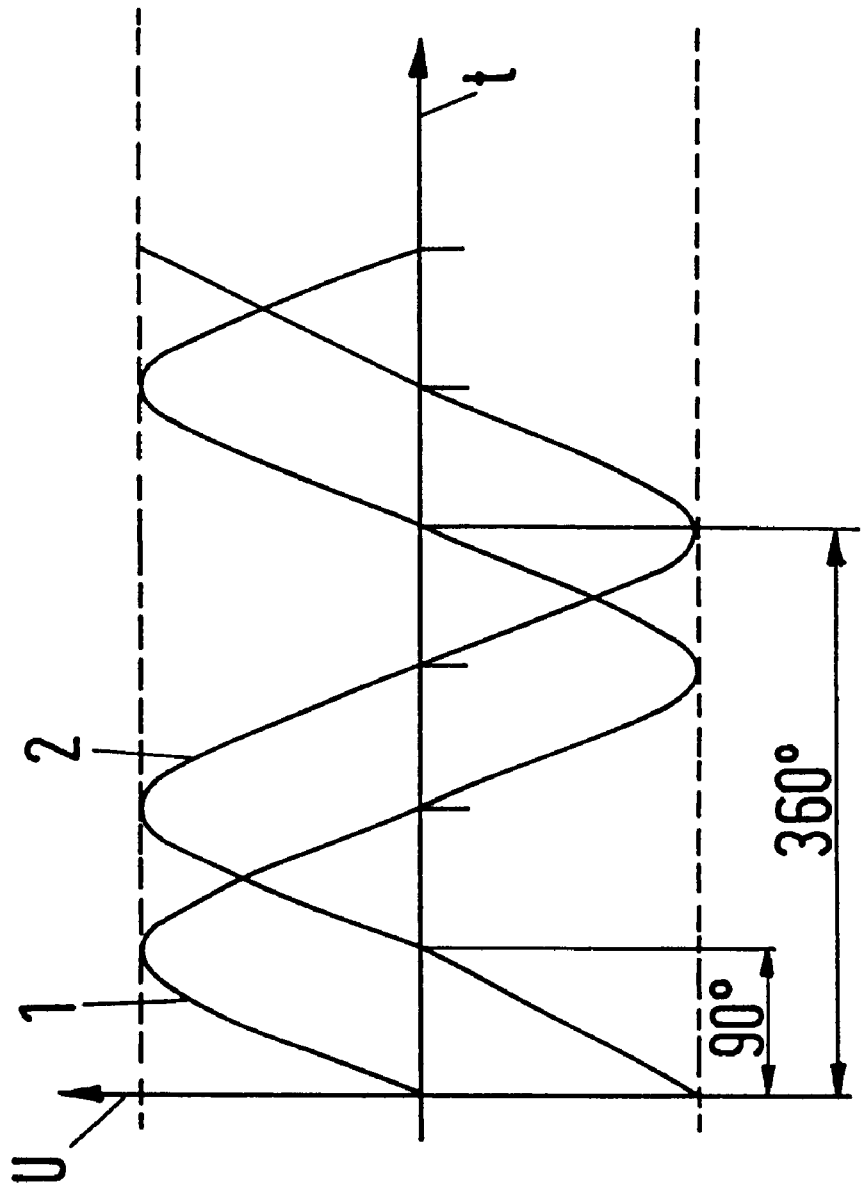
FIG. 1 is the plot of the output signals of two Hall sensors in the ideal case.
Figure 2:
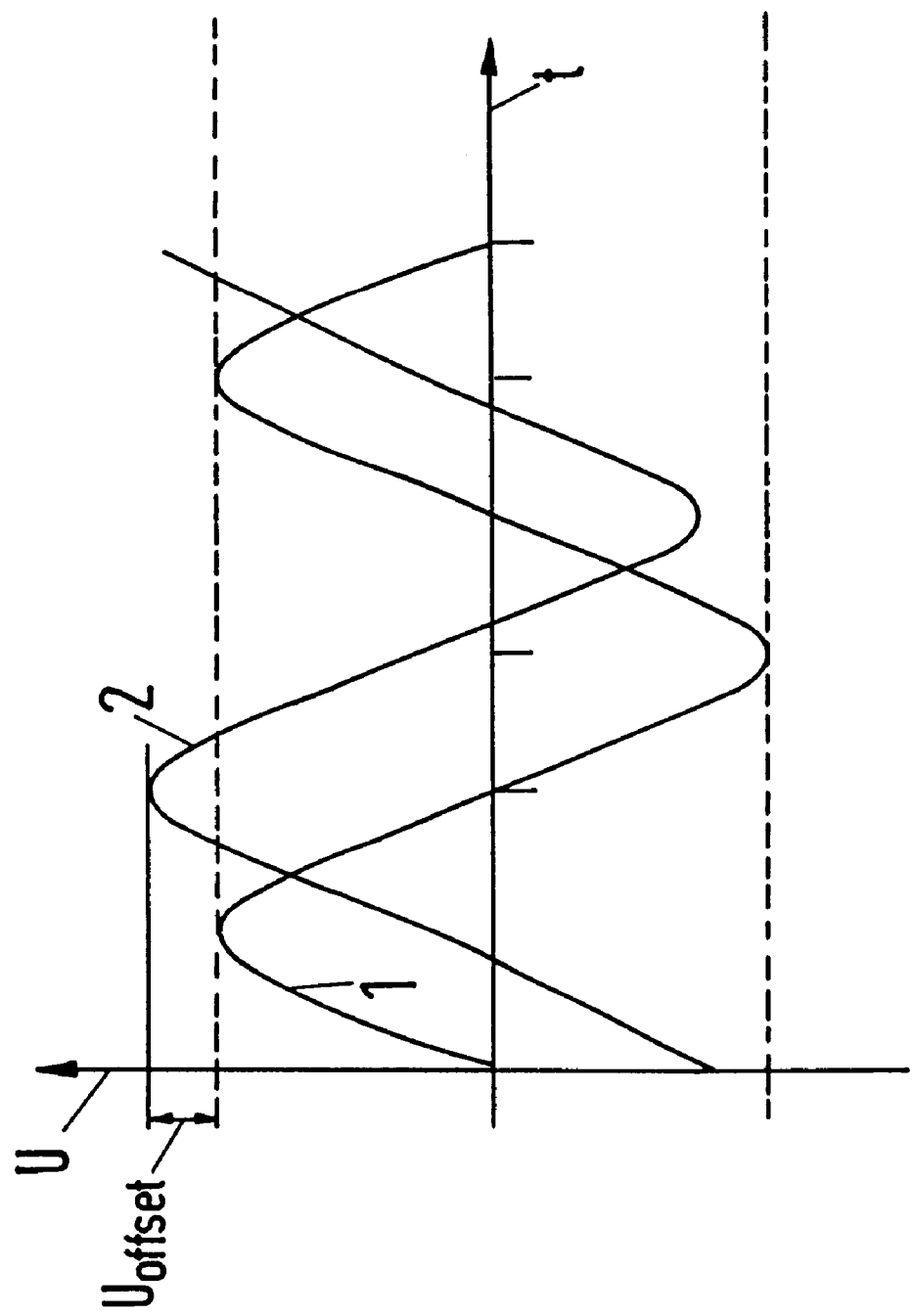
FIG. 2 is the plot of the output signals of two Hall sensors, with an offset voltage being superimposed on one output signal.
Figure 3:
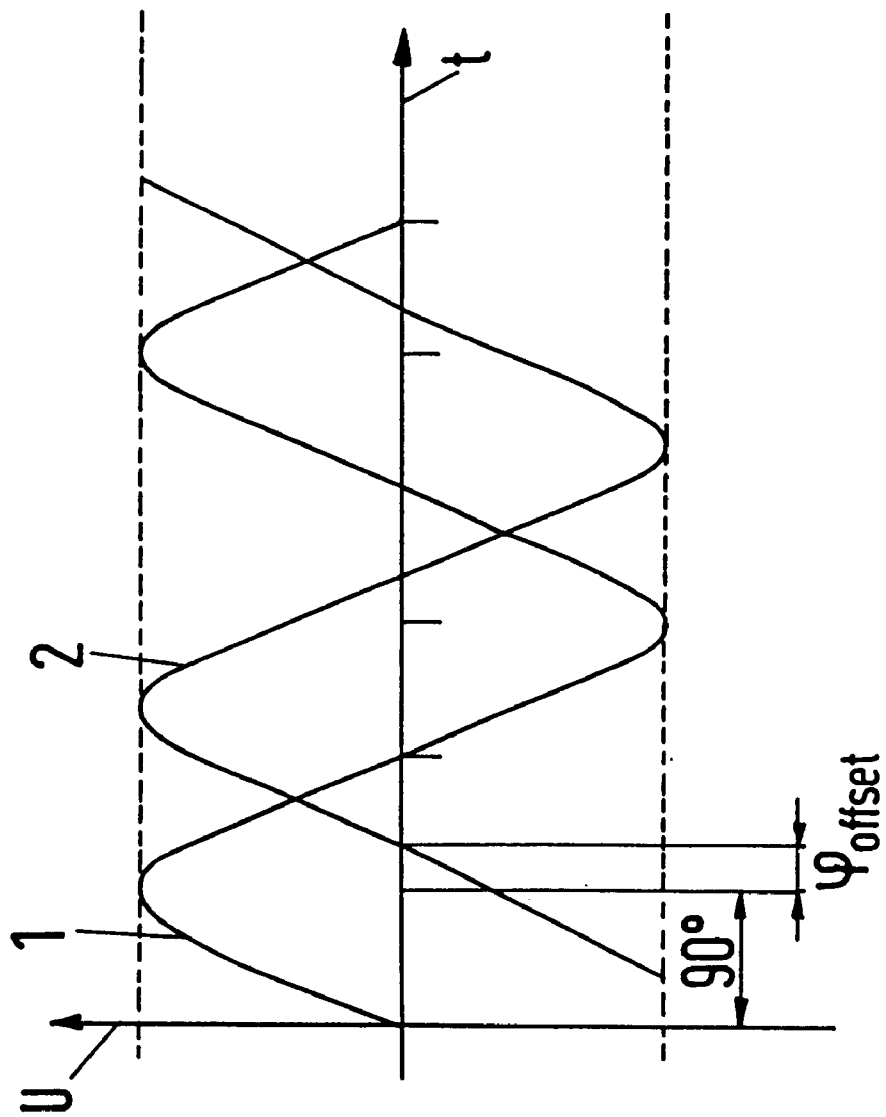
FIG. 3 is the plot of the output signals of two Hall sensors, with one output signal having a phase shift offset.
Figure 4:
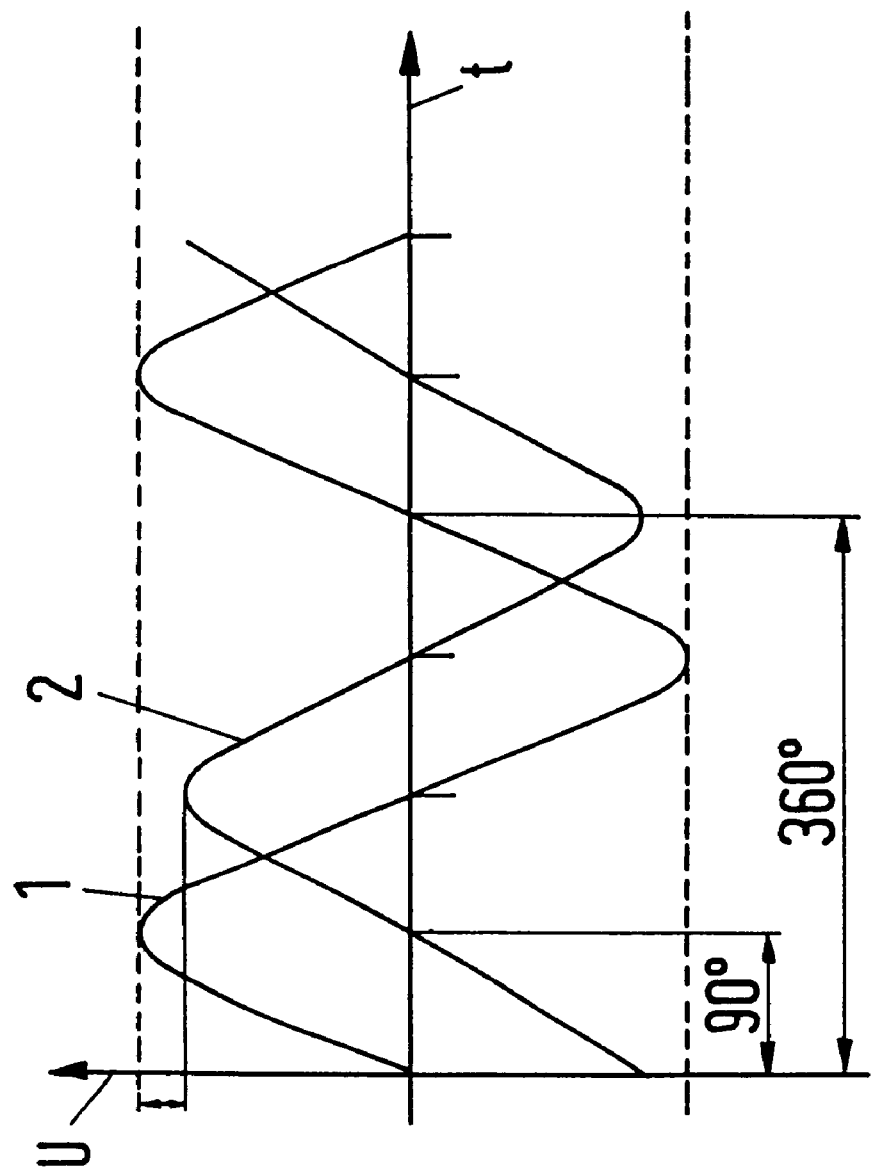
FIG. 4 is the plot of the output signals of two Hall sensors having a different amplification factor.
Figure 5:
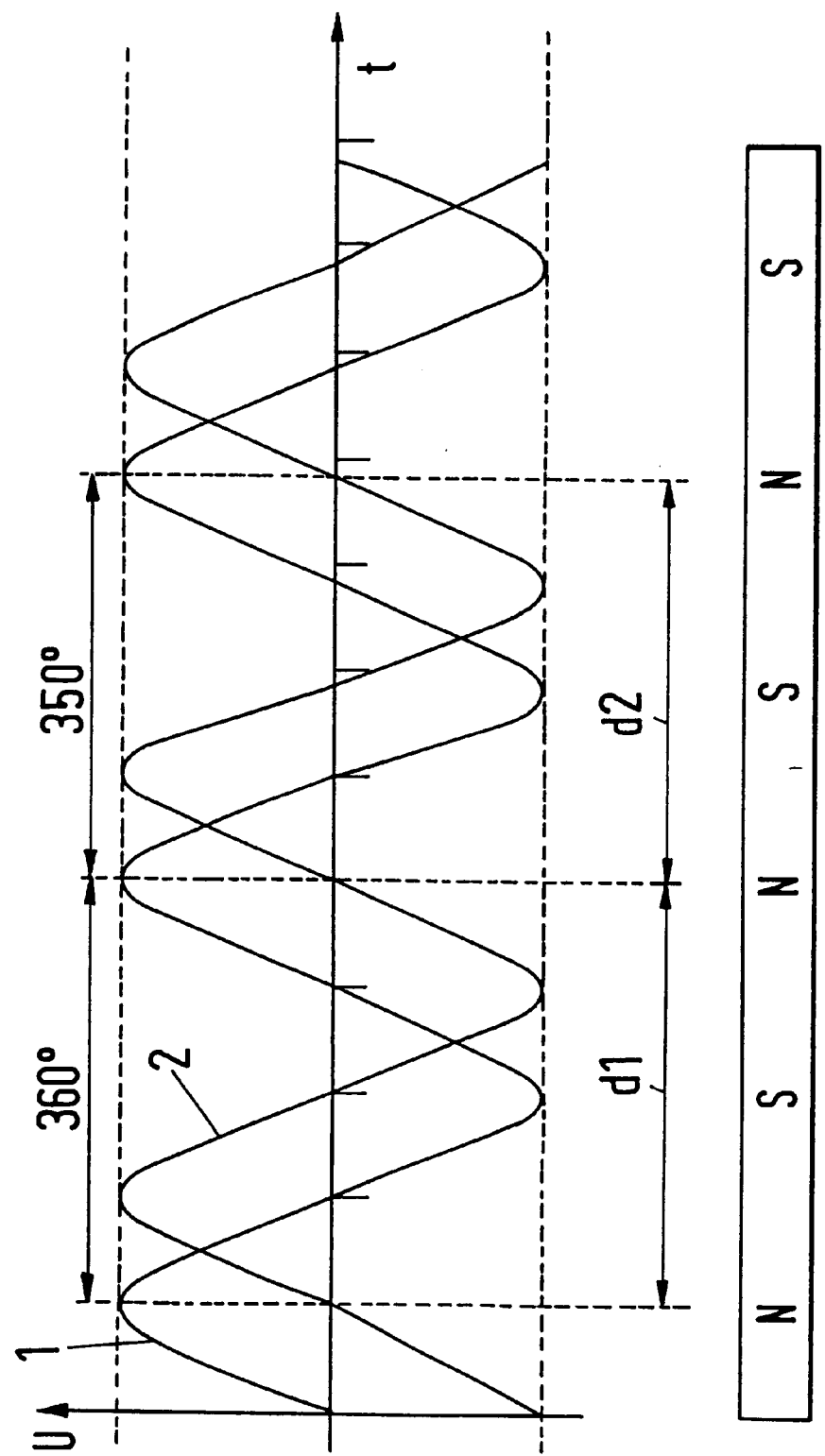
FIG. 5 is the plot of the output signals of two Hall sensors, with two successive like poles of the runner having a different distance from one another.
Figure 6:
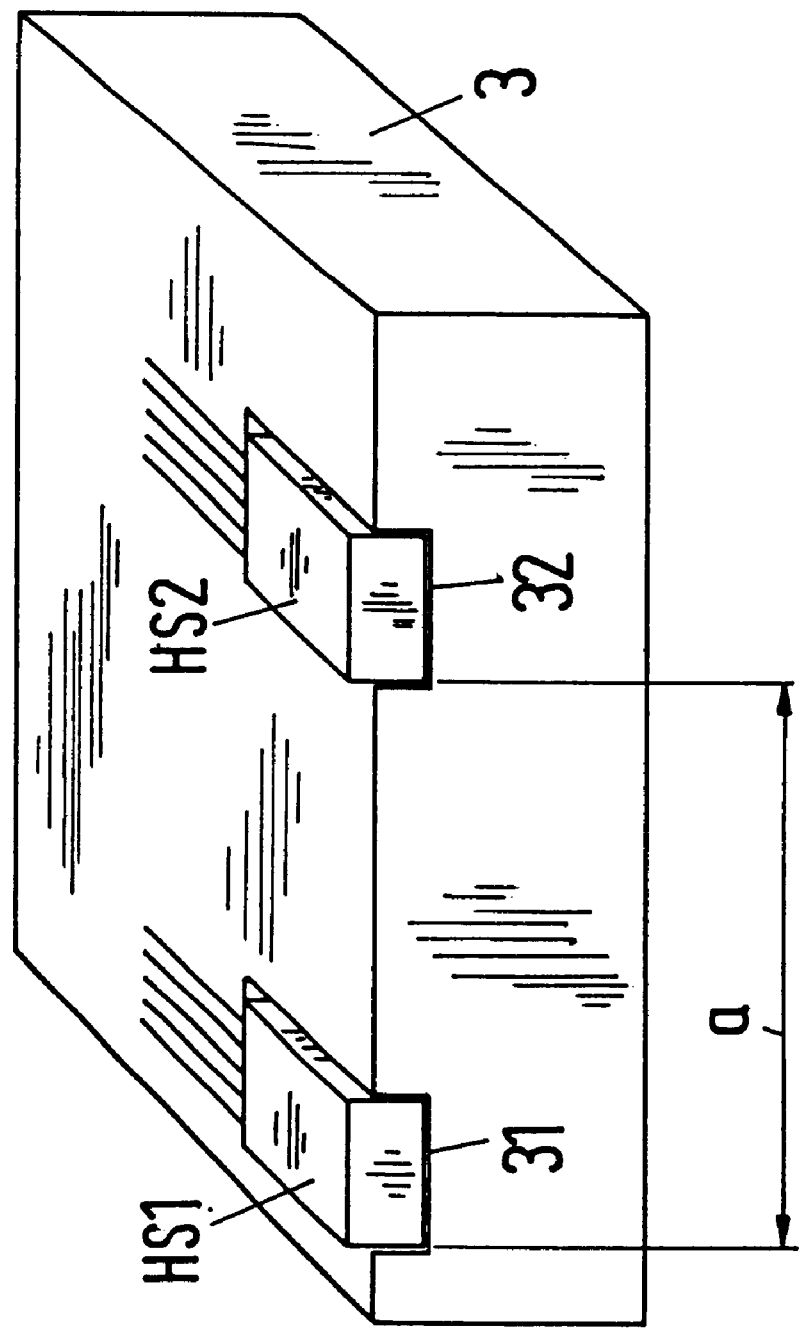
FIG. 6 illustrates a holder, in the depressions of which the Hall sensors are ideally arranged.

In the exemplary embodiment of a linear motor 4 in accordance with the invention shown in FIG. 9 one recognizes the stator 40 in which a plurality of coils 41 are arranged. Furthermore, one recognizes a runner 42 which comprises a plurality of magnets (not illustrated here). Furthermore, two Hall sensors 43 and 44 are arranged in the stator 40 which in each case give information on the current position of the linear motor. They are arranged in the ideal case (see further above) in such a manner that they produce a signal which is displaced by 90° when the runner 42 is moved in the direction of the longitudinal axis of the stator 40. In cooperation with the magnets of the runner 42 the coils 41 in the stator 40 effect a displacement of the runner 42 or hold the runner 42 firmly in a desired position respectively.

Finally one recognizes in the stator 40 a microelectronic circuitry 47 which comprises a memory unit 470 and a processor 471 for reading (data) out from the memory unit 470. These data can be transmitted with the help of a cable K to an electronics unit (not illustrated) which can, on the one hand, represent the connection to higher level control units and is, on the other hand, concerned with the control or regulation respectively of the linear motor 4 which is in each case connected to it.

Different data which are characteristic for the respective linear motor 4 can now be stored in this memory unit 470. These data can be read out by the electronics unit (not illustrated) with the help of the processor 471 on connecting up the linear motor 4.

If e.g. the characteristic data contain information on an offset voltage which is present, and/or a phase shift of set which is present, and/or on different amplification factors of the Hall sensors, and/or information on a non-uniform distance between adjacent like magnetic poles of the runner, then it is possible to take into account and correct respectively the deviations of the output signals which thereby arise. For this these data must however be known to the electronics unit which reads out these data, for example in an initialization phase on connecting the linear motor 4 to the electronics unit, out of the memory unit 470 with the help of the processor 471. Once the electronics unit has the corresponding data available, it can take these data into account exactly in the control or regulation respectively of the linear motor 4. Thus deviations from the ideal case—whatever their cause may be (component-immanent tolerances, tolerances in the assembly, etc.), which otherwise necessarily result in a certain imprecision in the control or regulation respectively of the linear motor—are taken into account and where appropriate corrected.

Furthermore, it is naturally possible to deposit the serial number as well as the type of the linear motor and the special variant of the linear motor within the same type as information in the memory unit 470 so that these data can likewise be read out of the memory unit 470 in the initialization phase. The manufacture date can also be stored and can be retrievable in this way.

Furthermore, the permissible temperature range in which the linear motor 4 may be operated can be deposited in the memory unit 470 and be retrievable therefrom.

Furthermore, it is possible to deposit a manufacturer code (so-called "brand labelling") in the memory unit 470 in this way. It is namely true today in the meantime that the same product is sold under different brand names and/or via different marketing channels. It is in the interest of the seller in some cases that products are admittedly as similar as possible in the manufacture, but are then however exclusively designated in such a manner that they cannot be replaced with one another by the customer. This interest can e.g. be given because the seller also sells a certain service guarantee along with his linear motor, whereas a competitor offers the same linear motor somewhat more cheaply, but does not offer any service however. Now the customer could indeed buy the more economical linear motor, but then take advantage of the service from the other manufacturer since the linear motors would not be distinguishable from one another. Such problems can be simply eliminated if a corresponding code is deposited in the memory unit 470 and the latter is read out by the electronics unit with the help of the processor 471 during the putting into service or in the initialization phase respectively.

Furthermore, it is also possible that the electronics unit writes certain data into the memory unit 470 during the operation with the help of the processor 471, or that the processor 471 does this automatically during the operation. For example the duration of the operation, the number of the movements completed by the runner 42 or an item of information on whether the customer had ever overloaded the linear motor 4 (recording of the current operating temperature and in particular of excessive temperatures) could be written into the memory unit 470. This can be useful in regard to a guarantee or service obligation respectively.

It is also possible that a test program is stored in the memory unit 470 which tests the linear motor 4 from time to time and where appropriate produces error reports or service reports respectively. The memory unit 470 can for example be designed as an EEPROM memory component (Electrically Erasable Programmable Read Only Memory). No battery is then required in the linear motor 4 since the function of the processor 471 for reading out of the memory unit 470 is not required until the linear motor 4 is connected to the electronics unit (putting into service, initialization phase). The required electrical supplying of the processor 471 then takes place through the electronics unit. The data which are stored in the EEPROM memory component then also remain present when the linear motor is separated from the electronics.

What is claimed is:

1. A linear motor comprising a stator and a runner which can be displaced in the direction of the longitudinal axis of the stator, wherein that the linear motor comprises at least one memory unit in which characteristic data for the respective linear motor are stored, wherein the data which are stored in the memory unit comprise manufacturing tolerances of one or more components of the linear motor.

2. A linear motor in accordance with claim 1, wherein the memory unit is arranged in the stator of the linear motor.

3. A linear motor in accordance with claim 1, wherein in addition to the memory unit the linear motor comprises means for reading the data out of the memory unit.

4. A linear motor in accordance with claim 1, wherein the data which are stored in the memory unit comprise the type of the linear motor.

5. A linear motor in accordance with claim 1, wherein the data which are stored in the memory unit comprise the serial number of the linear motor.

6. A linear motor in accordance with claim 1, wherein the data which are stored in the memory unit comprise tolerances which arise during the assembly of components of the linear motor.

7. A linear motor in accordance with claim 1, wherein the data which are stored in the memory unit comprise a manufacturer code or a marketer code.

8. A linear motor in accordance with claim 1, wherein a test program which is related to the respective linear motor is stored in the memory unit which tests the respective linear motor and where appropriate produces a corresponding error report.

9. A linear motor in accordance with claim 1, wherein writing means are provided which write operating data into the memory unit during the operation of the linear motor.

10. A linear motor in accordance with claim 9, wherein the write operating data comprises the respective current operating temperature.

* * * * *